US009769681B2

(12) United States Patent
Matsunaga et al.

(10) Patent No.: US 9,769,681 B2
(45) Date of Patent: Sep. 19, 2017

(54) APPARATUS, METHOD, AND NON-TRANSITORY COMPUTER READABLE MEDIUM FOR SELF-ORGANIZING NETWORK

(71) Applicant: NEC CORPORATION, Tokyo (JP)

(72) Inventors: Yasuhiko Matsunaga, Tokyo (JP); Atsushi Nakata, Tokyo (JP); Toshiyuki Sashihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/897,721

(22) PCT Filed: Feb. 17, 2014

(86) PCT No.: PCT/JP2014/000798
§ 371 (c)(1),
(2) Date: Dec. 11, 2015

(87) PCT Pub. No.: WO2014/203434
PCT Pub. Date: Dec. 24, 2014

(65) Prior Publication Data
US 2016/0127923 A1    May 5, 2016

(30) Foreign Application Priority Data

Jun. 17, 2013    (JP) .................................. 2013-126678

(51) Int. Cl.
*H04W 36/16*    (2009.01)
*H04W 36/24*    (2009.01)
(Continued)

(52) U.S. Cl.
CPC ....... *H04W 24/02* (2013.01); *H04W 28/0215* (2013.01); *H04W 28/0226* (2013.01);
(Continued)

(58) Field of Classification Search
CPC ............................. H04W 36/16; H04W 36/24
(Continued)

(56) References Cited

U.S. PATENT DOCUMENTS

2009/0318116 A1*  12/2009  Kim ...................... H04W 36/24
                                                    455/411
2011/0190016 A1*  8/2011  Hamabe ................ H04W 24/10
                                                    455/507
(Continued)

FOREIGN PATENT DOCUMENTS

EP          2 453 691 A1    5/2012
JP          2013-26980 A    2/2013
WO          WO2013/073077 A1    5/2013

OTHER PUBLICATIONS

3GPP TR 36.902 V9.3.1 (Mar. 2011) "3rd Generation Partnership Project; Technical Specification Group Radio Access Network; Evolved Universal Terrestrial Radio Access Network (E-UTRAN); Self-configuring and self-optimizing network (SON) use cases and solutions (Release 9)", Mar. 2011.
(Continued)

*Primary Examiner* — Christopher M Brandt
(74) *Attorney, Agent, or Firm* — Sughrue Mion, PLLC

(57) ABSTRACT

An apparatus (10) used in a Self-Organizing Network (SON) includes a SON execution unit (101) and an exclusion processing unit (105). The SON execution unit (101) executes a SON operation on a first cell (40), a second cell (41) or a neighboring cell pair (40 and 41), the SON operation including repeatedly adjusting a configuration parameter that affects an operation of a base station (20) or a mobile station (30) to achieve an optimization objective. The exclusion processing unit (105) excludes the first cell (40), the second cell (41) or the neighboring cell pair (40 and 41) from a future SON operation by the SON execution unit (101), if achievement status of the optimization objective
(Continued)

after completion of the SON operation by the SON execution unit (101) does not satisfy a predetermined reference level. This can contribute to suppression of execution of SON operation providing only little performance improvement.

41 Claims, 8 Drawing Sheets

(51) Int. Cl.

| | | |
|---|---|---|
| *H04W 24/02* | (2009.01) | |
| *H04W 28/02* | (2009.01) | |
| *H04W 28/08* | (2009.01) | |
| *H04W 36/00* | (2009.01) | |
| *H04W 36/38* | (2009.01) | |
| *H04W 48/06* | (2009.01) | |
| *H04W 72/04* | (2009.01) | |
| *H04W 88/02* | (2009.01) | |
| *H04W 88/08* | (2009.01) | |

(52) U.S. Cl.
CPC ....... *H04W 28/0236* (2013.01); *H04W 28/08* (2013.01); *H04W 36/0083* (2013.01); *H04W 36/385* (2013.01); *H04W 48/06* (2013.01); *H04W 72/0406* (2013.01); *H04W 88/02* (2013.01); *H04W 88/08* (2013.01)

(58) Field of Classification Search
USPC ........................................................ 455/436
See application file for complete search history.

(56) References Cited

U.S. PATENT DOCUMENTS

| | | | | |
|---|---|---|---|---|
| 2012/0307697 | A1* | 12/2012 | Mukhopadhyay .... | H04W 4/001 370/311 |
| 2013/0031036 | A1 | 1/2013 | Kojima | |
| 2013/0109389 | A1* | 5/2013 | Olofsson ........... | H04W 36/0083 455/436 |
| 2013/0115959 | A1* | 5/2013 | Amirijoo .......... | H04W 36/0083 455/440 |
| 2013/0242720 | A1* | 9/2013 | Chou ................ | H04W 28/0268 370/221 |
| 2014/0206360 | A1* | 7/2014 | Wegmann ............. | H04W 24/04 455/440 |
| 2014/0301277 | A1* | 10/2014 | Ueda ..................... | H04W 24/02 370/328 |
| 2015/0373563 | A1* | 12/2015 | Chou ................... | H04W 36/14 370/252 |
| 2015/0382209 | A1* | 12/2015 | Sanneck .............. | H04W 24/10 370/252 |

OTHER PUBLICATIONS

3GPP TS 32.500 V11.1.0 (Dec. 2011) "3rd Generation Partnership Project; Technical Specification Group Services and System Aspects; Telecommunication Management; Self-Organizing Networks (SON); Concepts and requirements (Release 11)", Dec. 2011.

Thomas Jansen, et al., "Weighted performance based handover parameter_optimization_in LTE". Vehicular Technology Conference (VTC Spring). 2011 IEEE 73rd, May 18, 2011, pp. 1-5.

International Search Report of PCT/JP2014/000798, dated Apr. 15, 2014. [PCT/ISA/210].

Ericsson, "SON coordination for ESM, COC and CCO functions", 3GPP TSG SA WG5 (Telecom Management) Meeting #86, S5-123172, Nov. 12-16, 2012, XP50689610, total 4 pages.

"3rd Generation Partnership Project; Technical Specification Group Services and System Aspects; Telecommunication management; Self-Organizing Networks (SON) policy Network Resource model (NRM) Integration Reference Point (IRP); Information Service (IS) (Release 11)", 3GPP TS 32.522, V11.5.1, Mar. 2013, XP50692431, total 57 pages.

Communication dated Feb. 14, 2017 from the European Patent Office in counterpart Application No. 14814244.1.

* cited by examiner

APPARATUS, METHOD, AND NON-TRANSITORY COMPUTER READABLE MEDIUM FOR SELF-ORGANIZING NETWORK

CROSS REFERENCE TO RELATED APPLICATIONS

This application is a National Stage of International Application No. PCT/JP2014/000798, filed Feb. 17, 2014, claiming priority based on Japanese Patent Application No. 2013-126678, filed Jun. 17, 2013, the contents of all of which are incorporated herein by reference in their entirety.

TECHNICAL FIELD

The present application relates to a control of a radio communication network, and more specifically, to self-optimization operations in a Self-Organizing Network (SON).

BACKGROUND ART

The Self-Organizing Network (SON) is a technique for automating configuration, optimization and healing in a radio network and mainly aims to improve the quality of the radio network and reduce the cost for operating the radio network. The Third Generation Partnership Project (3GPP) mainly standardizes the SON in the Long Term Evolution (LTE) and the LTE-Advanced (see Non-Patent Literature 1 and 2). The SON operations include, for example, self-configuration operations, self-optimization operations, and self-healing operations.

In the self-optimization operations, configuration parameters of one or more base stations are automatically adjusted in order to improve the quality of the radio network based on various types of information observed by base stations (or mobile stations). The configuration parameters of a base station have an influence on operations of one or both of a base station and a mobile station. The self-optimization operations include, for example, Automatic Neighbour Relations (ANR), Mobility Robustness Optimization (MRO), Coverage and Capacity Optimization (CCO), Mobility Load Balancing (MLB), Cell Range Expansion (CRE), energy saving management, inter-cell interference reduction, and Random Access Channel (RACH) optimization.

The SON architecture includes centralized architecture, distributed architecture, and hybrid architecture. In the centralized architecture, a SON entity arranged in a central node (e.g., operational support systems (OSS)) executes SON operations for a plurality of base stations. In the distributed architecture, a SON entity that executes SON operations is arranged in each base station, and the optimization of the whole radio network is achieved by communications among base stations. In the hybrid architecture, both the centralized architecture and the distributed architecture are used. For example, in the hybrid architecture, some SON operations are executed in the centralized architecture and other SON operations are executed by in the distributed architecture.

CITATION LIST

Non Patent Literature

[Non-Patent Literature 1] 3GPP TS 32.500 V11.1.0 (2011-12) "3rd Generation Partnership Project; Technical Specification Group Services and System Aspects; Telecommunication Management; Self-Organizing Networks (SON); Concepts and requirements (Release 11)", December, 2011

[Non-Patent Literature 2] 3GPP TR 36.902 V9.3.1 (2011-03) "3rd Generation Partnership Project; Technical Specification Group Radio Access Network; Evolved Universal Terrestrial Radio Access Network (E-UTRAN); Self-configuring and self-optimizing network (SON) use cases and solutions (Release 9)", March, 2011

SUMMARY OF INVENTION

Technical Problem

The present inventors have found that some problems occur when cells or neighboring cell pairs on which the SON operations (e.g., self-optimization operations) such as MRO and CCO are to be executed include a cell or a neighboring cell pair whose performance is not sufficiently improved even after execution of the self-optimization operations.

For example, to use computer resources for the SON operations on such kind of cells or neighboring cell pairs would be a waste of resources.

Further, one SON operation (e.g., MRO) and another SON operation (e.g., CCO or MLB) may adjust the same configuration parameter in order to achieve different optimization objectives (e.g., improvement of a handover performance of a neighboring cell pair and uniform load distribution between the neighboring cell pair). In other words, SON operations may compete with each other. Accordingly, while performing one SON operation (e.g., MRO), it is generally difficult to perform another SON operation (e.g., CCO or MLB). That is, SON operations having different objectives may need to be executed sequentially. Therefore, if it takes time to perform a SON operation which cannot sufficiently improve the performance of a cell or a neighboring cell pair, other SON operations may not be promptly executed.

Further, as stated above, SON operations may compete with each other to use the same configuration parameter. Therefore, when the configuration parameter is changed by the execution of one SON operation (e.g., MRO) to improve one performance index (e.g., handover performance), this change of the configuration parameter may have an influence on another performance index (e.g., load of the base station) controlled by another SON operation (e.g., MLB). It may be preferred that such a situation in which a SON operation that provides only little performance improvement affects another performance index controlled by another SON operation should be avoided.

The present invention has been made based on the above-described study by the present inventors and aims to provide an apparatus, a method, and a program for a Self-Organizing Network that can contribute to suppression of execution of a SON operation that provides only little performance improvement.

Solution to Problem

In a first aspect, an apparatus used in a SON includes a first execution unit and an exclusion processing unit. The first execution unit is configured to perform a first Self-Organizing Network (SON) operation on a first cell of a base station, a second cell adjacent to the first cell, or a neighboring cell pair consisting of the first and second cells. The first SON operation includes repeatedly adjusting a configuration parameter that affects an operation of one or both of the base station and a mobile station to achieve an optimization objective regarding a radio network. The exclusion processing unit is configured to exclude the first cell, the second cell or the neighboring cell pair from future execution of the first SON operation, if achievement status of the optimization objective after completion of the first SON operation does not satisfy a predetermined reference level.

In a second aspect, an apparatus used in a SON includes an execution unit capable of executing Mobility Robustness Optimization (MRO) for each of a plurality of neighboring cell pairs. The execution unit is configured to refer to an exclusion list used to identify one or more excluded cell pairs that should be excluded from the MRO and execute the MRO on a cell pair other than the one or more excluded cell pairs among the plurality of neighboring cell pairs.

In a third aspect, a base station apparatus that serves a first cell includes an execution unit and a messaging unit. The execution unit is configured to be able to execute a Self-Organizing Network (SON) operation on a plurality of neighboring cell pairs each consisting of the first cell and each of neighboring cells. The SON operation includes repeatedly adjusting a configuration parameter that affects an operation of one or both of the base station apparatus and a mobile station to achieve an optimization objective regarding a radio network. The messaging unit is configured to exchange messages with a neighboring base station. Further, the messaging unit is configured to receive a change request message for requesting change of the configuration parameter from the neighboring base station. Furthermore, the messaging unit is configured to, in response to the change request message, send to the neighboring base station a rejection message indicating that the change of the configuration parameter is rejected, if a first neighboring cell pair consisting of the first cell and a neighboring cell served by the neighboring base station is excluded from the SON operation.

In a fourth aspect, a method for a SON operation includes:

(a) executing a first Self-Organizing Network (SON) operation on a first cell of a base station, a second cell adjacent to the first cell, or a neighboring cell pair consisting of the first and second cells, the first SON operation including repeatedly adjusting a configuration parameter that affects an operation of one or both of the base station and a mobile station to achieve an optimization objective regarding a radio network; and (b) excluding the first cell, the second cell or the neighboring cell pair from the future execution of the first SON operation, if achievement status of the optimization objective after completion of the first SON operation does not satisfy a predetermined reference level.

In a fifth aspect, a method for a SON operation includes: referring to an exclusion list used to identify one or more excluded cell pairs that should be excluded from Mobility Robustness Optimization (MRO); and executing the MRO on cell pairs other than the one or more excluded cell pairs among the plurality of neighboring cell pairs.

In a sixth aspect, a method performed by a base station apparatus that serves a first cell includes:

(a) receiving from a neighboring base station a change request message for requesting change of a configuration parameter that affects an operation of one or both of the base station apparatus and a mobile station; and (b) in response to the change request message, sending to the neighboring base station a rejection message indicating that the change of the configuration parameter is rejected, if a first neighboring cell pair consisting of the first cell and a neighboring cell served by the neighboring base station is excluded from a Self-Organizing Network (SON) operation including repeatedly adjusting the configuration parameter to achieve an optimization objective regarding a radio network.

In a seventh aspect, a program includes a program for causing a computer to perform the method according to any one of the fourth to sixth aspects stated above.

Advantageous Effects of Invention

According to the aspects stated above, it is possible to provide an apparatus, a method, and a program for Self-Organizing Network that can contribute to suppression of execution of a SON operation that provides only little performance improvement.

DESCRIPTION OF EMBODIMENTS

Hereinafter, with reference to the drawings, specific embodiments will be described in detail. Throughout the drawings, the same reference symbols are attached to the same or corresponding components and overlapping descriptions will be omitted as appropriate as necessary for the sake of clarity of the description.

First Embodiment

Figure 1:
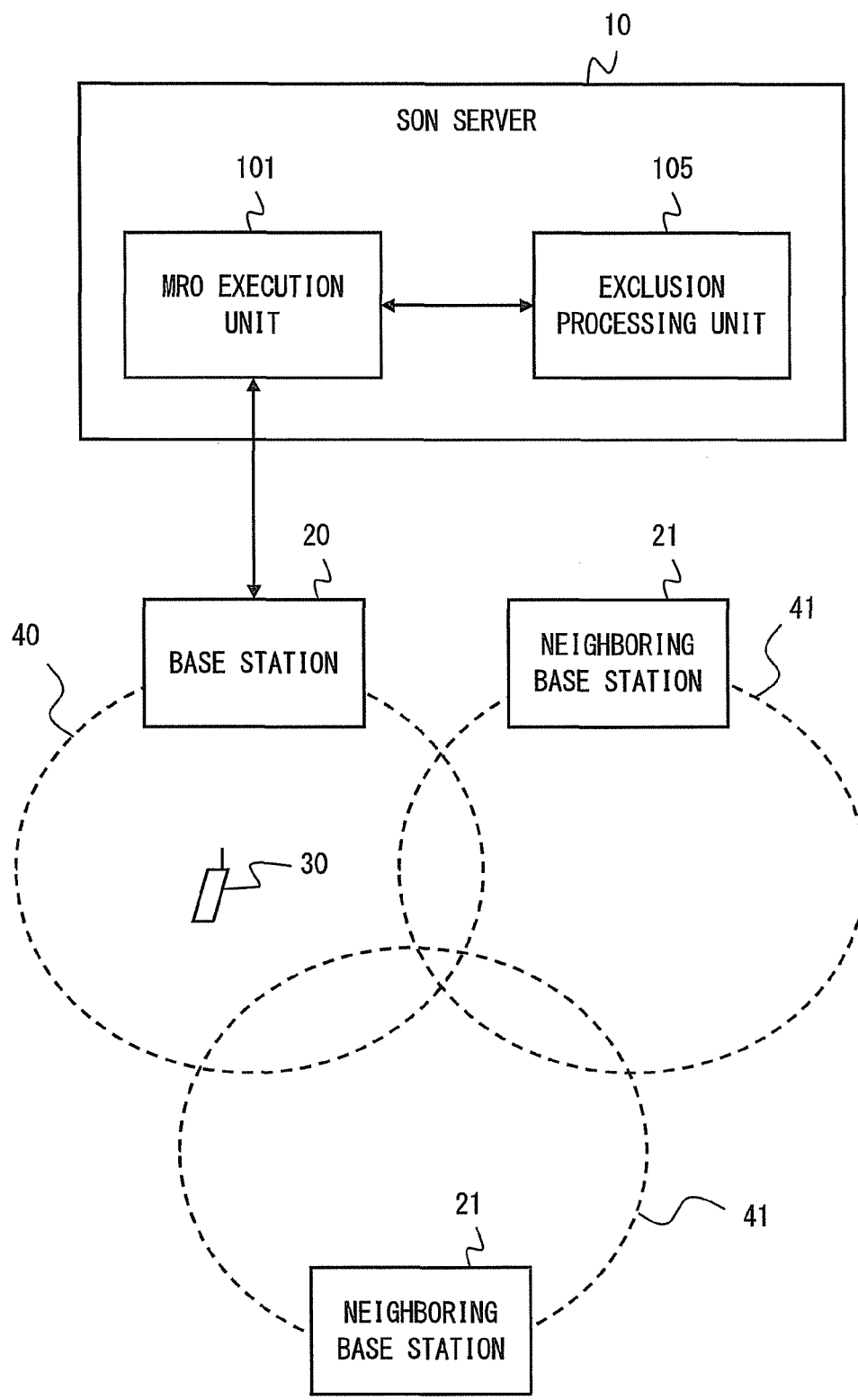
FIG. 1 is a diagram showing a configuration example of a cellular radio communication system according to a first embodiment.

FIG. 1 shows a configuration example of a cellular radio communication system according to this embodiment. A base station 20 serves a cell 40 and communicates with a mobile station 30 in the cell 40. The cell 40 is adjacent to at least one neighboring cell 41. Each neighboring cell 41 is served by a neighboring base station 21.

A SON server 10 performs one or more SON operations regarding the base station 20, the cell 40 or a neighboring cell pair consisting of the cell 40 and each neighboring cell 41. The SON server 10 may be arranged outside of the base station 20. For example, the SON server 10 may be arranged in an OSS in the centralized architecture. Alternatively, some or all of the functions of the SON server 10 may be integrally arranged with the base station 20 in the distributed architecture or the hybrid architecture.

One or more SON operations performed by the SON server 10 relate to, for example, self-configuration operations, self-optimization operations, self-healing operations, or any combination thereof. To be more specific, at least one of the SON operations performed by the SON server 10 includes repeatedly adjusting a configuration parameter to achieve an optimization objective regarding a radio network (e.g., the base station 20, the cell 40 or each neighboring cell pair consisting of the cell 40 and each neighboring cell 41).

The configuration parameter is a parameter that affects the operation of one or both of the base station 20 and the mobile station 30 and is configured in the base station 20. The configuration parameter may be sent to the mobile station 30 from the base station 20 after it is configured in the base station 20.

The optimization objective means the goal of the optimization by adjusting the configuration parameter. The optimization objective is defined using one or more performance indices related to the base station 20, the cell 40 or each neighboring cell pair consisting of the cell 40 and each neighboring cell 41. The performance index is, for example, a handover failure rate, a ping-pong handover rate, a reception quality of a downlink signal, an interference level between neighboring cells, or a load of a radio network node. The optimization objective may be called an optimization strategy or an optimization policy. Further, the optimization objective may be defined as an objective function depending on one or more performance indices or as an objective function and a constraint condition in the case of constrained optimization.

In the following description, a case in which the SON server 10 executes at least the Mobility Robustness Optimization (MRO) will be described. However, the SON server 10 may execute another SON operation (e.g., Coverage and Capacity Optimization (CCO)). In the MRO, a handover parameter that affects a handover of the mobile station 30 is repeatedly adjusted to improve handover performance (e.g., a handover failure rate or a ping-pong handover rate).

That is, the configuration parameter used in the MRO includes a handover parameter that affects a handover of the mobile station 30. The handover parameter includes, for example, at least one of (a) a first offset (e.g., A3-offset) that acts on radio quality of the cell 40, (b) a second offset (e.g., Cell Individual Offset (CIO)) that acts on radio quality of each neighboring cell 41, and (c) guard time (e.g., Time To Trigger (TTT)) to trigger transmission of a measurement report by the mobile station 30.

The optimization objective of the MRO is defined using one or more handover performance indices (e.g., a handover failure rate or a ping-pong handover rate). The optimization objective of the MRO is, for example, "to reduce the handover failure rate to equal or lower than a predetermined threshold", or "to reduce the ping-pong handover rate to equal or lower than a predetermined threshold". The optimization objective of the MRO may be expressed using an objective function depending on one or more handover performance indices. For example, the optimization objective of the MRO may be defined using the objective function shown in the following Expression (1). The objective function HP of Expression (1) is expressed as a weighted sum of a plurality of handover performance indices. In Expression (1), R_HOF represents the handover failure rate, R_PPHO represents the ping-pong handover rate, w1 represents the weight factor applied to the handover failure rate R_HOF, and w2 represents the weight factor applied to the ping-pong handover rate R_PPHO.

$$HP = w1 \cdot R\_HOF + w2 \cdot R\_PPHO \quad (1)$$

The SON server 10 shown in FIG. 1 includes an MRO execution unit 101 and an exclusion processing unit 105. The MRO execution unit 101 performs the above-described MRO processing on one or more neighboring cell pairs regarding the cell 40 (i.e., each pair of the cell 40 and each neighboring cell 41). That is, the MRO execution unit 101 repeatedly adjusts a handover parameter that affects a handover of the mobile station 30 to achieve the optimization objective defined using one or more handover performance indices.

The MRO execution unit 101 may initiate the MRO processing periodically or aperiodically for each of the plurality of neighboring cell pairs. The aperiodic MRO processing may be triggered when, for example, a handover performance index (e.g., a handover failure rate or a ping-pong handover rate) is below a predetermined initiation threshold. Alternatively, the aperiodic MRO processing may be initiated in response to a reception of a change request for requesting change of the handover parameter from another network node (e.g., neighboring base station 21).

The MRO execution unit 101 ends the MRO processing when the optimization objective has been achieved by adjusting the handover parameter. Further, the MRO execution unit 101 ends the MRO processing when a repeat count of the processing loop (loop count) that involves changing the handover parameter has reached an upper-limit value before the optimization objective is achieved. Further, the MRO execution unit 101 ends the MRO processing when the handover parameter has reached a predetermined upper-limit value or a predetermined lower-limit value during the repeated processing loop before the optimization objective is achieved.

The exclusion processing unit 105 determines whether an achievement status of the optimization objective after completion of the MRO processing by the MRO execution unit 101 satisfies a predetermined reference level. If the achievement status of the optimization objective does not satisfy the predetermined reference level, the exclusion processing unit 105 excludes the neighboring cell pair (i.e., the pair consisting of the cell 40 and one of neighboring cells 41), which the MRO processing was performed on, from future execution of the MRO processing by the MRO execution unit 101.

Whether the optimization objective after completion of the MRO processing satisfies the predetermined reference level may be determined by judging whether the value of at least one performance index (e.g., a handover failure rate, a ping-pong handover rate) to evaluate the optimization state or a value of the objective function (e.g., Expression (1)) depending on the at least one performance index exceeds a predetermined threshold for exclusion. The predetermined threshold for exclusion may equal to the initiation threshold used to determine whether to initiate the MRO processing in the MRO execution unit 101. In other words, if the handover performance in a neighboring cell pair (the cell 40 and one of neighboring cells 41) is degraded compared to that when the MRO initiated even after the MRO processing involving repeatedly adjusting the handover parameter has been performed, the exclusion processing unit 105 may exclude this neighboring cell pair from future execution of the MRO processing.

The MRO execution unit 101 that operates in collaboration with the exclusion processing unit 105 is able to execute MRO processing on a plurality of neighboring cell pairs and performs MRO processing on one or more neighboring cell pairs that have not been excluded by the exclusion processing unit 105 among the plurality of neighboring cell pairs.

The MRO execution unit 101 may initiate the MRO processing on each neighboring cell pair after checking whether this cell pair has not been excluded from the MRO processing.

The exclusion processing unit 105 may create an exclusion list in which one or more neighboring cell pairs excluded from the MRO processing are recorded. In this case, the MRO execution unit 101 may refers to the exclusion list to determine whether to execute the MRO processing on each neighboring cell pair.

The operation of restoring the excluded neighboring cell pair, which excluded from the MRO processing, to targets of the MRO processing (i.e., the operation of cancellation of the exclusion) may be performed as follows. In one example, when a predetermined period of time has passed since a neighboring cell pair was excluded from the MRO processing, the exclusion of the neighboring cell pair may be canceled. This is because the network environment changes as the predetermined period of time has passed and thus there is a possibility that the handover performance is improved by the MRO processing.

In another example, when the neighboring cell list of the cell 40 has been updated manually by an operator or updated automatically by the Automatic Neighbour Relations (ANR) processing, the exclusion of one or more neighboring cell pairs each including the cell 40 may be canceled. This is because updating of the neighboring cell list means that the state of the neighboring cells of the cell 40 has been changed and thus there is a possibility that the handover performance is improved by the MRO processing.

In another example, when the neighboring cell pair is excluded from the MRO processing and then the handover performance of the neighboring cell pair that has been excluded is further degraded and exceeds a predetermined threshold for cancellation, the exclusion of the neighboring cell pair may be canceled. This is because there is a possibility that a serious failure such as throughput degradation due to frequent occurrences of Radio Link Failure (RLF) can be avoided.

Figure 2:
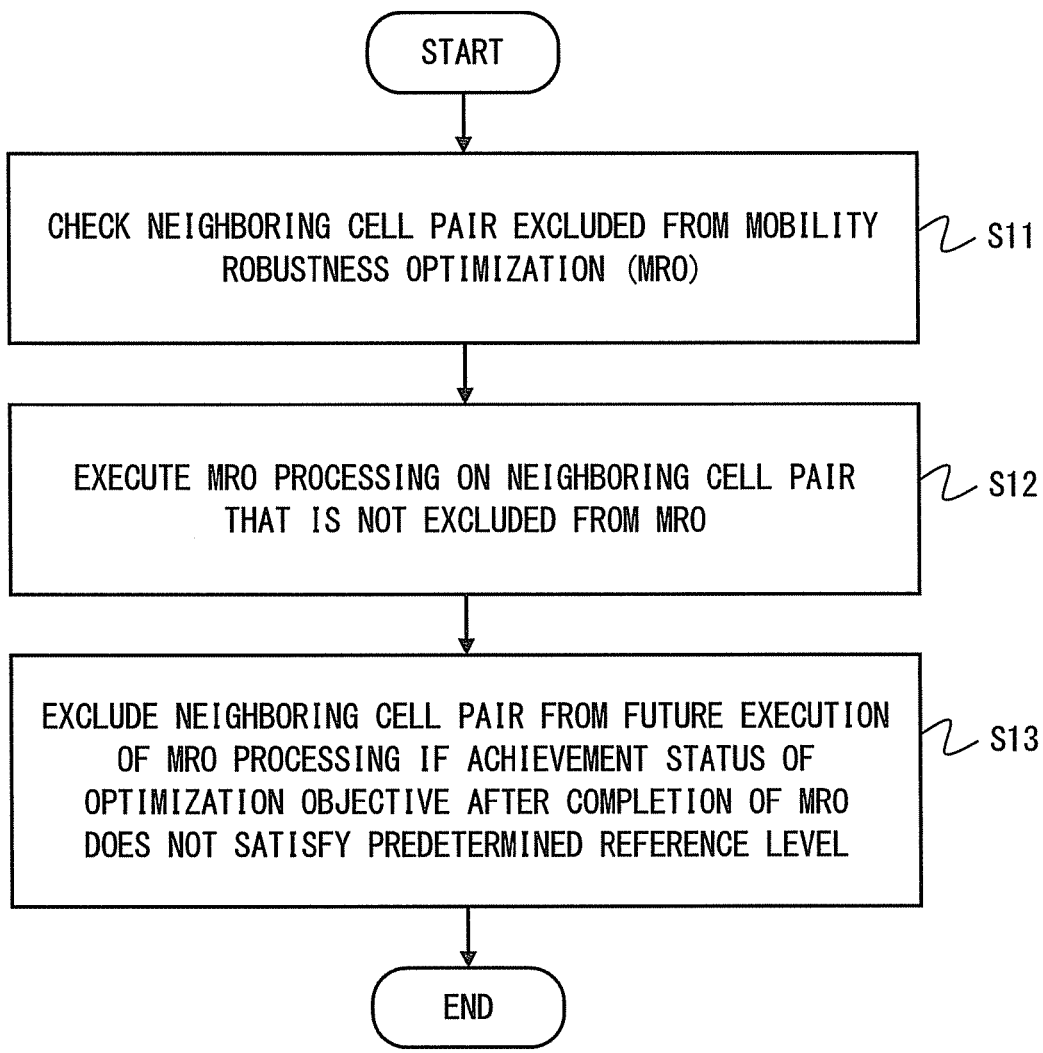
FIG. 2 is a flowchart showing an example of a procedure for executing a SON operation according to the first embodiment.

FIG. 2 is a flowchart showing an example of the procedure for executing the self-optimization operations according to this embodiment. In Step S11, the SON server 10 (MRO execution unit 101) checks neighboring cell pairs excluded from the MRO. In Step S12, the SON server 10 (MRO execution unit 101) performs the MRO on a neighboring cell pair that is not excluded from the MRO. In Step S13, the SON server 10 (exclusion processing unit 105) evaluates the achievement status of the optimization objective after completion of the MRO processing. If the achievement status of the optimization objective does not meet a predetermined reference level, the SON server 10 (exclusion processing unit 105) excludes the neighboring cell pair, which the MRO processing in Step S12 was performed on, from future execution of the MRO processing.

As will be understood from the above description, first, the SON server 10 according to this embodiment includes the exclusion processing unit 105 and operates to automatically exclude a cell or a neighboring cell pair whose performance has not been sufficiently improved even after execution of a SON operation (e.g., MRO processing) from future execution of the SON operation. The SON server 10 can thus contribute to suppression of execution of the SON operation on the cell or the neighboring cell pair whose performance will not be sufficiently improved. It is thus possible, for example, to suppress the use of computer resources for the SON operation which provides only little performance improvement. Further, it is possible, for example, to avoid a situation in which other SON operation cannot be promptly performed since it takes time to perform the SON operation which provides only little performance improvement. Further, it is also possible, for example, to avoid a situation in which the SON operation which provides only little performance improvement has an influence on another performance index controlled by another SON operation.

Further, since the SON server 10 includes the exclusion processing unit 105, the SON server 10 can automatically determine a cell or a neighboring cell to be excluded from the SON operation. It is thus possible to eliminate the workload of the operator. Further, since the SON server 10 includes the exclusion processing unit 105, the SON server 10 can stop dynamically and timely the SON operation on the cell or the neighboring cell pair whose performance will not be sufficiently improved, compared to a manual configuration operation performed by the operator.

Further, second, the SON server 10 according to this embodiment checks, before starting the MRO processing on a neighboring cell pair, whether the neighboring cell pair has not been excluded from the MRO processing and operates to perform the MRO processing on the neighboring cell pair only when the neighboring cell pair has not been excluded from the MRO processing. The SON server 10 can thus contribute to suppression of execution of the MRO processing on the neighboring cell pair whose performance will not be sufficiently improved.

In order to obtain the above second effect, the automatic exclusion from the SON operation of the cell or the neighboring cell pair by the exclusion processing unit 105 may not be necessarily performed. For example, the exclusion list that defines cells or neighboring cell pairs that should be excluded from one SON operation may be created by a manual configuration operation by the operator. In this case, the SON server 10 may refer to the exclusion list, which is configured by the operator, before starting the MRO processing on a neighboring cell pair and perform the MRO processing on the neighboring cell pair only when the neighboring cell pair has not been excluded from the MRO processing by the operator.

In the above description, the example in which the exclusion from the MRO processing is performed per neighboring-cell-pair basis has been described. However, the exclusion from the MRO processing may be performed on the unit of a source cell or the unit of a plurality of target cells (i.e., plurality of neighboring cells). The unit for the exclusion may be determined according to the handover parameter adjusted in the MRO processing. For example, when optimization using a Cell Individual Offset separately configured for each target cell (neighboring cell 41) is performed, the exclusion may be performed per neighboring cell pair consisting of the cell 40 and one of neighboring cells 41 or per neighboring cell 41. Alternatively, when optimization using a handover parameter that commonly acts on handovers to the plurality of neighboring cells 41 such as Time To Trigger (TTT) is performed, the exclusion may be performed on the unit of a source cell (cell 40) or the unit of a plurality of neighboring cells 41.

Second Embodiment

In this embodiment, a modification of the first embodiment will be described. A configuration example of a cellular radio communication system according to this embodiment is similar to the configuration example shown in FIG. 1. In this embodiment, an example in which exclusion (or cancellation of the exclusion) of the neighboring cell pair (or the base station 20, the cell 40) from one SON operation (e.g., MRO processing) is associated with another SON operation (e.g., ANR processing, MLB processing, CRE processing) will be described.

Figure 3:
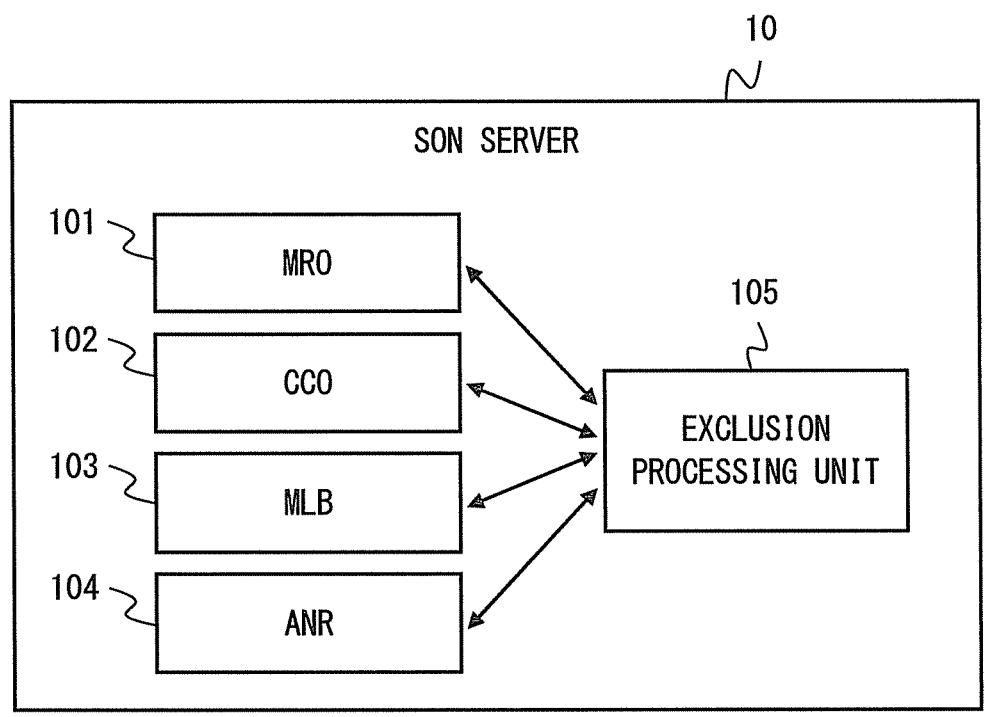
FIG. 3 is a diagram showing a configuration example of a SON server according to a second embodiment.

FIG. 3 is a block diagram showing a configuration example of the SON server 10 according to this embodiment. The SON server 10 may be arranged outside of the base station 20. Further, the functions of the SON server 10 may be integrally arranged with the base station 20. The SON server 10 according to this embodiment is configured to perform a plurality of SON operations. In the example shown in FIG. 3, the SON server 10 includes for example, but not limited to, a Mobility Robustness Optimization (MRO) execution unit 101, a Coverage and Capacity Optimization (CCO) execution unit 102, a Mobility Load Balancing (MLB) execution unit 103, and an Automatic Neighbour Relations (ANR) execution unit 104.

Figure 4:
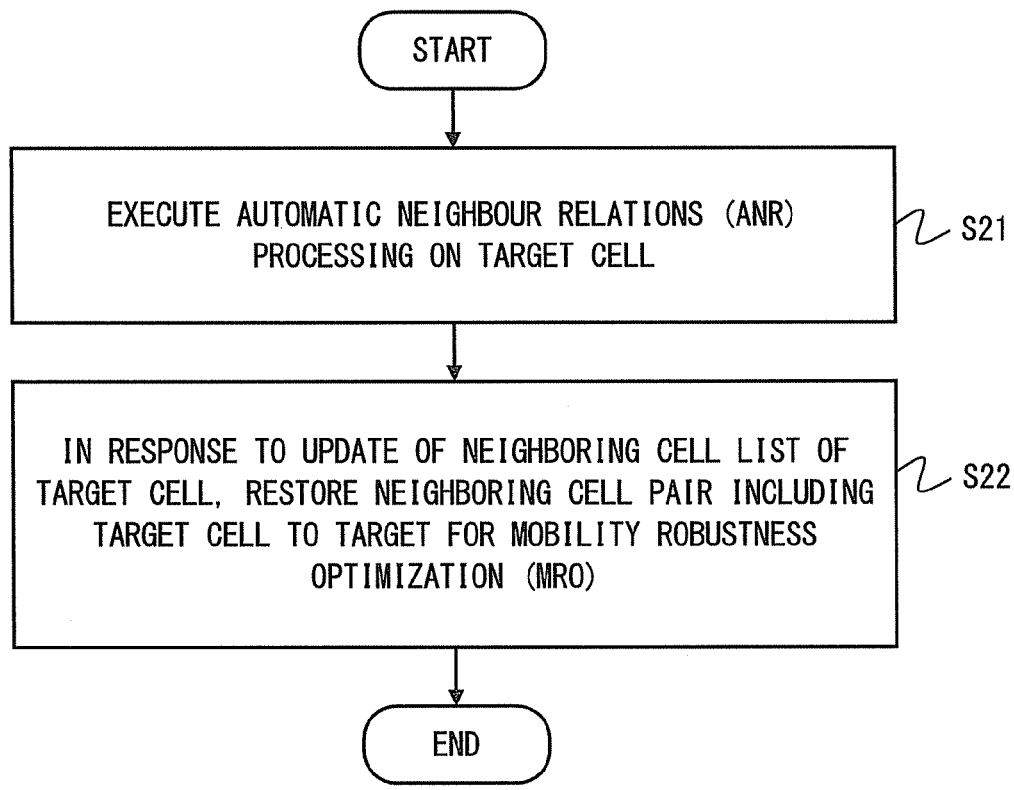
FIG. 4 is a flowchart showing an example of an operation of the SON server according to the second embodiment.

FIG. 4 is a flowchart showing an example of the operation of the SON server 10 according to this embodiment. In Step S21, the ANR execution unit 104 performs the ANR processing for the cell 40 served by the base station 20. In Step S22, in response to updating of the neighboring cell list of the cell 40, the exclusion processing unit 105 restores one or more neighboring cell pairs, each including the cell 40 among the cell pairs excluded from the MRO processing, to targets of the MRO processing. For example, in Step S22, the exclusion of one or more neighboring cell pairs having the cell 40 as a source cell may be canceled.

Since updating of the neighboring cell list means that the state of the neighboring cells of the cell 40 has been changed, there is a possibility that the handover performance is improved by the MRO processing. Accordingly, as shown in FIG. 4, by re-starting the MRO processing on one or more neighboring cell pairs each including the cell 40 in response to updating of the neighboring cell list of the cell 40, improvement of the handover performance by the MRO processing can be expected.

Figure 5:
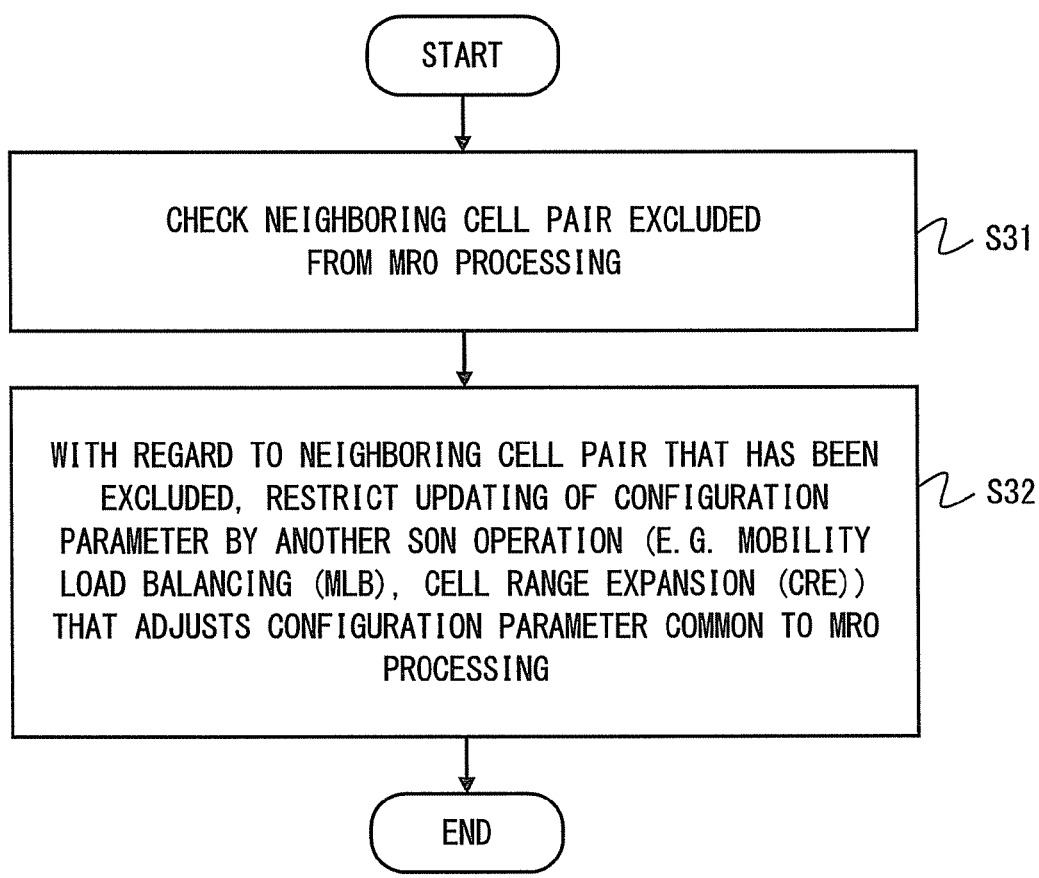
FIG. 5 is a flowchart showing another example of the operation of the SON server according to the second embodiment.

FIG. 5 is a flowchart showing another example of the operation of the SON server 10 according to this embodiment. As already described above, SON operations may use a common configuration parameter and compete with each other. In the example shown in FIG. 5, updating by another SON operation (e.g., MLB processing, CRE processing) of the configuration parameter, which is also used by the MRO processing, is restricted.

In Step S31, another SON processing unit (e.g., MLB processing unit 103) checks the neighboring cell pair(s) excluded from the MRO processing by the MRO execution unit 101. In Step S32, with regard to the neighboring cell pair(s) excluded from the MRO processing, another SON processing unit (e.g., MLB processing unit 103) restricts updating of the configuration parameter, which is also used by the MRO processing. To restrict updating of the configuration parameter, the range in which the configuration parameter can be changed may be reduced or the configuration parameter may be set to a fixed value, for example.

According to the example shown in FIG. 5, it is possible to prevent degradation of the handover performance of the neighboring cell pair, which is excluded from the MRO processing, due to updating of the configuration parameter (i.e., handover parameter) by another SON operation that competes with the MRO processing.

Note that the combination of a SON operation that performs the exclusion and another SON operation is not limited to the specific examples stated above.

Third Embodiment

In this embodiment, modification of the first or second embodiment described above will be described. The following describes signaling between neighboring base stations in a distributed architecture in which the SON function is arranged in each base station, when one of the neighboring base stations performs an operation for excluding a neighboring cell pair or the like from a SON operation.

Figure 6:
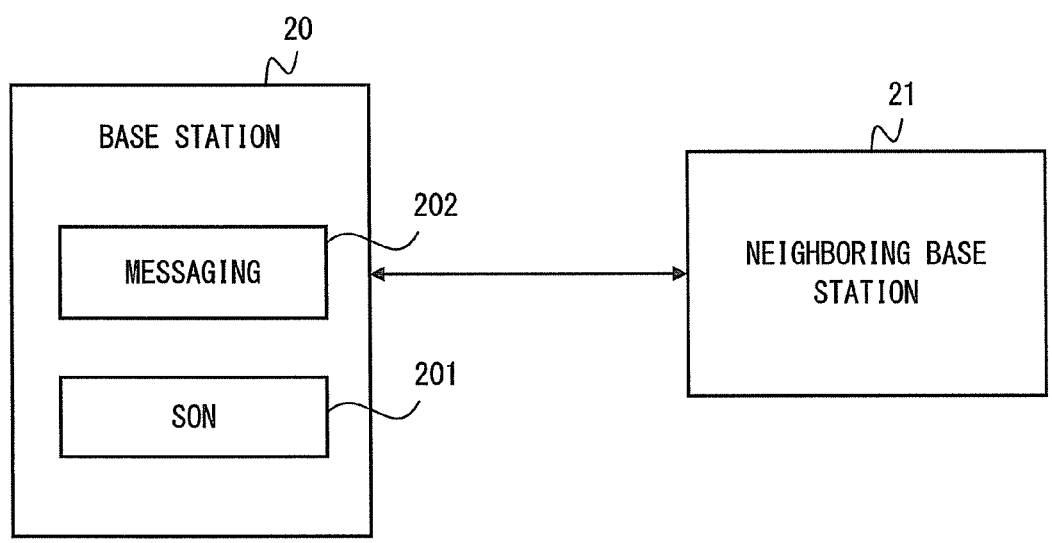
FIG. 6 is a diagram showing a configuration example of a cellular radio communication system according to a third embodiment.

FIG. 6 is a block diagram showing a configuration example of a cellular radio communication system according to this embodiment. In this embodiment, the base station 20 includes a radio communication unit (not shown) that serves the cell 40 and also includes a SON processing unit 201 and a messaging unit 202. The SON processing unit 201 operates in a similar way as the SON server 10 described in the first or second embodiment. The messaging unit 202 exchanges messages with the neighboring base station 21. The messages may be exchanged between the base station 20 and the neighboring base station 21 on an inter-base station interface (e.g., X2 interface) that provides transparent communications between application layers of the two base stations. Alternatively, the messages may be exchanged between the base station 20 and the neighboring base station 21 via another network node (e.g., Mobility Management Node (MME)).

In a first example, the messaging unit 202 operates to receive from the neighboring base station 21 a change request message for requesting change of the configuration parameter. In response to the change request message, the messaging unit 202 operates to send a rejection message indicating that the change of the configuration parameter is rejected (or indicating that the change of the configuration parameter is prohibited) to the neighboring base station 21, if the neighboring cell pair consisting of the cell 40 of the base station 20 and the neighboring cell 41 of the neighboring base station 21 is excluded from one or more SON operations by the SON processing unit 201. The configuration parameter here is a configuration parameter used in one or more SON operations in the SON processing unit 201.

When the X2 application protocol is used for the messaging between the base stations, the change request message may be a MOBILITY CHANGE REQUEST message and the rejection message may be a MOBILITY CHANGE FAILURE message. In this case, the MOBILITY CHANGE REQUEST message may include an existing Cause value indicating "Handover Optimization". On the other hand, the MOBILITY CHANGE FAILURE message may include a new Cause value indicating that the change of the configuration parameter is prohibited.

Figure 7:
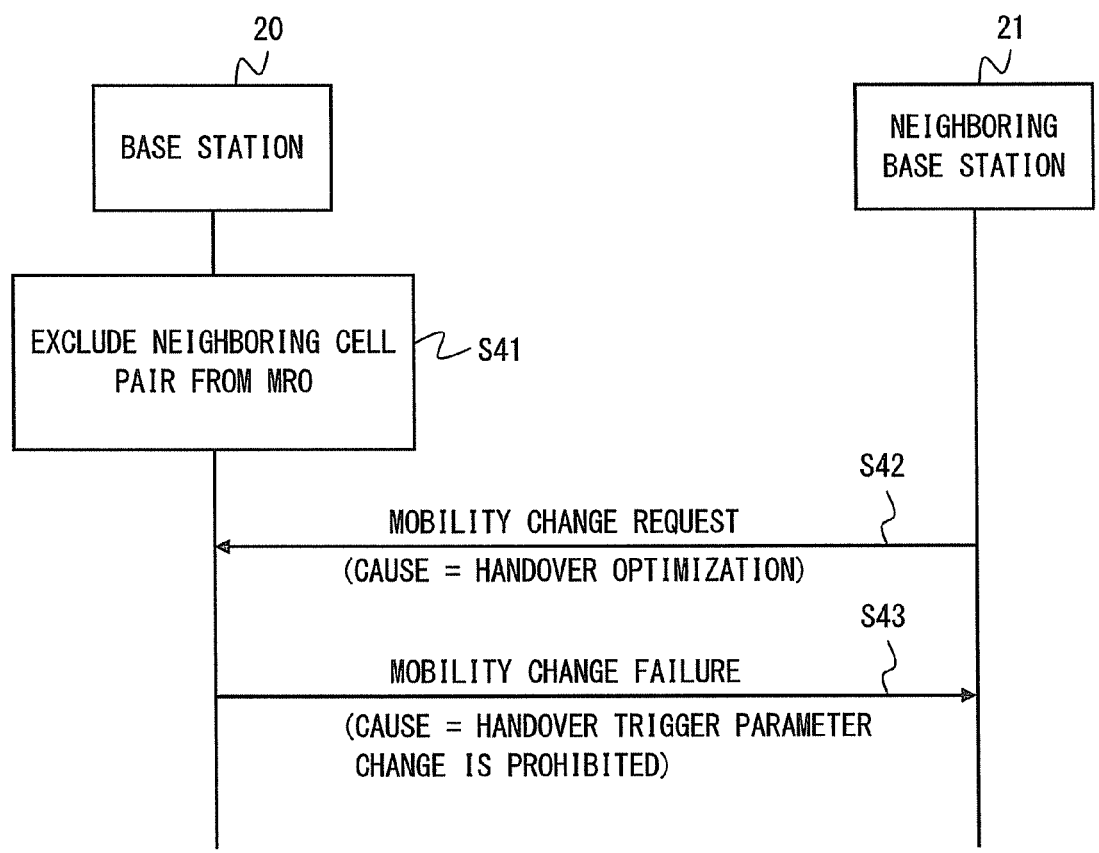
FIG. 7 is a flowchart showing an example of an operation of the cellular radio communication system according to the third embodiment.

FIG. 7 is a sequence diagram showing an example of the exchange of the change request message and the rejection message. In Step S41, the SON processing unit 201 of the base station 20 excludes the neighboring cell pair from the MRO processing. In Step S42, the messaging unit 202 of the base station 20 receives the change request message for requesting change of the configuration parameter from the neighboring base station 21. In the example shown in FIG. 7, the change request message is the MOBILITY CHANGE REQUEST message including the existing Cause value indicating "Handover Optimization". In Step S43, the messaging unit 202 sends to the neighboring base station 21 the rejection message indicating that the change of the configuration parameter is rejected. In the example shown in FIG. 7, the rejection message is the MOBILITY CHANGE FAILURE message including the new Cause value indicating that the change of the configuration parameter is prohibited.

According to the first example stated above, by the signaling between the base stations, execution of a SON operation in the neighboring base station 21 can be suppressed with regard to the cell 40, the cell 41 or the neighboring cell pair on which the base station 20 prohibits the SON operation. Therefore, in the first example stated above, it is possible to prohibit a SON operation in the neighboring base station 21 and prevent degradation of the network performance such as the handover performance.

Next, a second example of the signaling between the base stations will be described. In the second example, in response to exclusion of the neighboring cell 41 or the neighboring cell pair including the neighboring cell 41 from one SON operation (e.g., MRO processing) by the SON processing unit 201, the messaging unit 202 operates to send a notification indicating that another SON operation (e.g., MLB processing) is prohibited to the neighboring base station 21 that serves the neighboring cell 41.

When the neighboring cell pair is excluded from the MRO processing, for example, the messaging unit 202 may send a notification indicating that the MLB processing is prohibited. When the Information Service (IS) conforming to the Integration Reference Point (IRP) of the E-UTRAN Network Resource Model (NRM) is used for the messaging between the base stations, this notification may be a NEIGHBOUR CELL RELATION notification indicating "isLBAllowed=NO".

Figure 8:
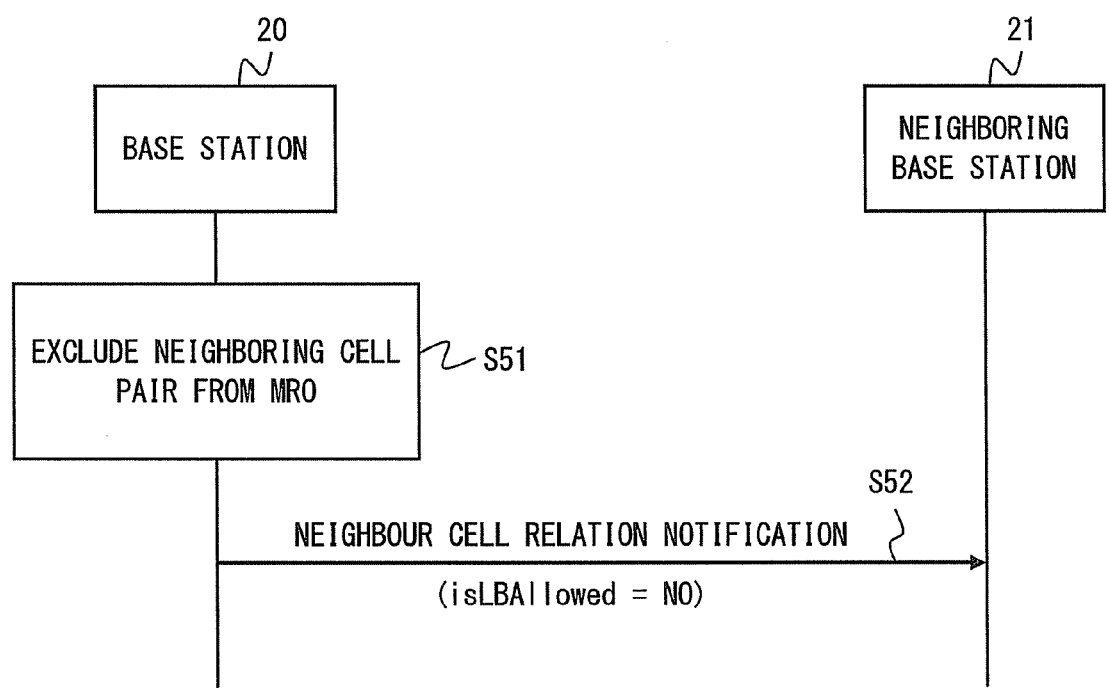
FIG. 8 is a flowchart showing another example of the operation of the cellular radio communication system according to the third embodiment.

FIG. 7 is a sequence diagram showing an example of transmission of a notification indicating that another SON operation is prohibited. In Step S51, the SON processing unit 201 of the base station 20 excludes the neighboring cell pair from the MRO processing. In Step S52, the messaging unit 202 of the base station 20 sends the notification indicating that the MLB processing between the cell 40 and the neighboring cell 41 is prohibited. In the example shown in FIG. 8, this notification is the NEIGHBOUR CELL RELATION notification indicating "isLBAllowed=NO".

According to the second example described above, by the signaling between the base stations execution of a SON operation in the neighboring base station 21 can be suppressed with regard to the cell 40, the cell 41 or the neighboring cell pair on which the base station 20 prohibits a SON operation. Therefore, according to the above second example, it is possible to prohibit a SON operation in the neighboring base station 21 and prevent degradation of the network performance such as the handover performance.

Other Embodiments

In the embodiments stated above, a SON operation (e.g., MRO processing) executed by the SON server 10 or the SON processing unit 201 may include a first optimization loop by a first optimization algorithm and a second optimization loop by a second optimization algorithm. The second optimization algorithm is performed when a first optimization objective has not been achieved in the first optimization loop. The second optimization algorithm may be different from the first algorithm in terms of at least one of (a) optimization objective, (b) performance index used to define the optimization objective, (c) threshold used in determination with regard to the performance index, and (d) adjustment direction of the configuration parameter. The exclusion processing unit 105 may exclude the cell 40, the neighboring cell 41 or the neighboring cell pair from future execution of the SON operation if the achievement status of the optimization objective after completion of the second optimization loop does not satisfy a predetermined reference level. In this example, at least two-stage optimization algorithms is used and it is thus possible to increase the probability that the optimization can be achieved without performing the exclusion of the cell 40, the neighboring cell 41 or the neighboring cell pair from the SON operation.

Further, in the embodiments stated above, when the cell 40, the neighboring cell 41 or the neighboring cell pair is excluded from the SON operation, the value of the configuration parameter may be returned to a past value before execution of the last SON operation or to a past value that provided a high network performance.

Further, in the embodiments stated above, the MRO may be performed using performance indices including a handover failure rate and a ping-pong handover rate. In this case, in response to exclusion of the neighboring cell pair from the MRO processing, the configuration parameter may be fixed to its value at the time when the ping-pong handover rate is reduced (e.g., the time of reducing the CIO by one step width). It is therefore possible to prevent the MRO processing from being stopped in a state in which the ping-pong handover rate is high, and it is possible to contribute to a reduction in power consumption in the mobile station 30.

Further, the embodiments stated above may be combined as appropriate.

Further, the processing performed by the SON server 10, the base station 20, the SON processing unit 201, the messaging unit 202 and the like described in the embodiments stated above may be achieved by causing a computer system to execute a program. Specifically, one or more programs including instructions for causing the computer system to perform the algorithms described with reference to the flowcharts and the sequence diagrams in this specification may be created and this program(s) may be supplied to the computer system.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, the above embodiments are merely examples of applications of technical ideas obtained by the present inventors. Needless to say, these technical ideas are not limited to the above embodiments and various changes may be made thereto.

This application is based upon and claims the benefit of priority from Japanese Patent Application No. 2013-126678, filed on Jun. 17, 2013, the disclosure of which is incorporated herein in its entirety by reference.

REFERENCE SIGNS LIST

10 SELF-ORGANIZING NETWORK (SON) SERVER
20 BASE STATION
21 NEIGHBORING BASE STATION
30 MOBILE STATION
40 CELL
41 NEIGHBORING CELL
101 MOBILITY ROBUSTNESS OPTIMIZATION (MRO) EXECUTION UNIT
102 COVERAGE AND CAPACITY OPTIMIZATION (CCO) EXECUTION UNIT
103 MOBILITY LOAD BALANCING (MLB) EXECUTION UNIT
104 AUTOMATIC NEIGHBOUR RELATIONS (ANR) EXECUTION UNIT
105 EXCLUSION PROCESSING UNIT
201 SELF-ORGANIZING NETWORK (SON) OPERATION UNIT
202 MESSAGING UNIT

The invention claimed is:

1. An apparatus used in a Self-Organizing Network (SON), the apparatus comprising:
at least one memory that stores instructions; and
at least one processor configured to execute the instructions to execute modules comprising:
a first execution module configured to execute a first Self-Organizing Network (SON) operation on a first cell of a base station, a second cell adjacent to the first cell, or a neighboring cell pair consisting of the first and second cells, the first SON operation including repeatedly adjusting a configuration parameter that affects an operation of one or both of the base station and a mobile station to achieve an optimization objective regarding a radio network; and
an exclusion module configured to exclude the first cell, the second cell or the neighboring cell pair from future execution of the first SON operation, if achievement status of the optimization objective after completion of the first SON operation does not satisfy a predetermined reference level.

2. The apparatus according to claim 1, wherein the first SON operation is Mobility Robustness Optimization (MRO) or Coverage and Capacity Optimization (CCO).

3. The apparatus according to claim 1, wherein the optimization objective is defined using at least one of a handover failure rate, a ping-pong handover rate, a reception quality of a downlink signal, an interference level between neighboring cells, and a load of a radio network node.

4. The apparatus according to claim 1, wherein the configuration parameter includes a handover parameter that affects a handover of the mobile station; and
wherein the handover parameter includes at least one of (a) a first offset that acts on radio quality of the first cell, (b) a second offset that acts on radio quality of the second cell, and (c) guard time to trigger transmission of a measurement report by the mobile station.

5. The apparatus according to claim 1, wherein
the first SON operation includes a first optimization loop by a first optimization algorithm and a second optimization loop by a second optimization algorithm, the second optimization loop is executed when a first optimization objective has not been achieved in the first optimization loop, and
the exclusion module is configured to exclude the first cell, the second cell, or the neighboring cell pair from the future execution of the first SON operation if the achievement status of the optimization objective after completion of the second optimization loop does not satisfy the predetermined reference level.

6. The apparatus according to claim 1, wherein the first execution module is configured to execute the first SON operation on a plurality of neighboring cell pairs and execute the first SON operation on one or more neighboring cell pairs that are not excluded by the exclusion module among the plurality of neighboring cell pairs.

7. The apparatus according to claim 6, wherein the first execution module is configured to check whether each of the plurality of neighboring cell pairs is excluded from the first SON operation by the exclusion module.

8. The apparatus according to claim 1, wherein the exclusion module is configured to create an exclusion list indicating cells or neighboring cell pairs excluded from the first SON operation.

9. The apparatus according to claim 1, wherein the first SON operation is determined to be completed when the optimization objective has been achieved, a repeat count of a processing loop that involves changing the configuration parameter has reached a predetermined number, or the configuration parameter has reached a predetermined upper-limit value or a predetermined lower-limit value during the repeated processing loop.

10. The apparatus according to claim 1, wherein whether the optimization objective after the completion of the first SON operation satisfies the predetermined reference level is determined by whether a value of at least one performance index to evaluate a state of the optimization or a value of an objective function depending on the at least one performance index exceeds a predetermined threshold for exclusion.

11. The apparatus according to claim 10, wherein the predetermined threshold for exclusion is equal to a threshold used to determine to initiate the first SON operation.

12. The apparatus according to claim 1, wherein the modules further comprise a messaging module configured to exchange messages with a neighboring base station, wherein
the messaging module is configured to receive a change request message for requesting change of the configuration parameter from the neighboring base station, and
the messaging module is configured to, in response to the change request message, send to the neighboring base station a rejection message indicating that the change of the configuration parameter is rejected, if a first neighboring cell pair consisting of the first cell and the second cell served by the neighboring base station is excluded from the first SON operation.

13. The apparatus according to claim 1, wherein the modules further comprise a second execution module configured to execute a second SON operation regarding the radio network,
wherein the second execution module is configured to reduce a range in which the configuration parameter can be changed or sets the configuration parameter to a fixed value during the second SON operation on the first cell, the second cell or the neighboring cell pair that is excluded from the first SON operation by the exclusion module.

14. The apparatus according to claim 13, wherein the second SON operation includes one or both of Mobility Load Balancing (MLB) and Cell Range Expansion (CRE).

15. The apparatus according to claim 1, wherein the modules further comprise a third execution module configured to execute Automatic Neighbour Relations (ANR), wherein the third execution module is configured to, in response to updating of a neighboring cell list of the first cell by the ANR on the first cell, cancel the exclusion of the first cell or the neighboring cell pair from the first SON operation.

16. The apparatus according to claim 1, wherein the exclusion module is configured to, in response to exclusion of the second cell or the neighboring cell pair from the first SON operation, send, to a neighboring base station that serves the second cell, a notification indicating that a fourth SON operation is prohibited.

17. The apparatus according to claim 16, wherein the fourth SON operation includes Mobility Load Balancing (MLB).

18. The apparatus according to claim 1, wherein the exclusion module is configured to cancel exclusion of the first cell, the second cell or the neighboring cell pair from the first SON operation when a value of a performance index regarding the first cell, the second cell or the neighboring cell pair excluded from the first SON operation exceeds a predetermined threshold for cancellation.

19. The apparatus according to claim 1, wherein
the first SON operation is Mobility Robustness Optimization (MRO) that uses performance indices including a handover failure rate and a ping-pong handover rate, and
the exclusion module is configured to, in response to exclusion of the neighboring cell pair from the MRO, fix the configuration parameter to a value of the configuration parameter at the time when the ping-pong handover rate is reduced.

20. The apparatus according to claim 1, wherein the apparatus is arranged in the base station that serves the first cell.

21. A base station apparatus that serves a first cell, the base station apparatus comprising:
at least one memory that stores instructions; and
at least one processor configured to execute the instructions to execute modules comprising:
an execution module configured to execute a Self-Organizing Network (SON) operation on a plurality of neighboring cell pairs each consisting of the first cell and each of neighboring cells, the SON operation including repeatedly adjusting a configuration parameter that affects an operation of one or both of the base station apparatus and a mobile station to achieve an optimization objective regarding a radio network; and
a messaging module configured to exchange for exchanging messages with a neighboring base station, wherein
the messaging module is configured to receive a change request message for requesting change of the configuration parameter from the neighboring base station, and
the messaging module is configured to, in response to the change request message, send to the neighboring base station a rejection message indicating that the change of the configuration parameter is rejected, if a first neighboring cell pair consisting of the first cell and a neighboring cell served by the neighboring base station is excluded from the SON operation.

22. The base station apparatus according to claim 21, wherein
the change request message is a MOBILITY CHANGE REQUEST message of an X2 application protocol, and the rejection message is a MOBILITY CHANGE FAILURE message of the X2 application protocol.

23. The base station apparatus according to claim 21, wherein the modules further comprise an exclusion module configured to exclude a neighboring cell pair from future execution of the SON operation by the execution module, if achievement status of the optimization objective after completion of the SON operation on the neighboring cell pair does not satisfy a predetermined reference level.

24. The base station apparatus according to claim 23, wherein the execution module is configured to check whether each of the plurality of neighboring cell pairs is excluded from the SON operation by the exclusion module and execute the SON operation on one or more cell pairs that are not excluded by the exclusion module among the plurality of neighboring cell pairs.

25. The base station apparatus according to claim 21, wherein the SON operation is Mobility Robustness Optimization (MRO) or Coverage and Capacity Optimization (CCO).

26. The base station apparatus according to claim 21, wherein the configuration parameter is a handover parameter that affects a handover of the mobile station.

27. A method for a Self-Organizing Network (SON) operation, the method comprising;
executing a first Self-Organizing Network (SON) operation on a first cell of a base station, a second cell adjacent to the first cell, or a neighboring cell pair consisting of the first and second cells, the first SON operation including repeatedly adjusting a configuration parameter that affects an operation of one or both of the base station and a mobile station to achieve an optimization objective regarding a radio network; and
excluding the first cell, the second cell or the neighboring cell pair from the future execution of the first SON operation, if achievement status of the optimization objective after completion of the first SON operation does not satisfy a predetermined reference level.

28. The method according to claim 27, wherein the first SON operation is Mobility Robustness Optimization (MRO) or Coverage and Capacity Optimization (CCO).

29. The method according to claim 27, wherein
the first SON operation includes a first optimization loop by a first optimization algorithm and a second optimization loop by a second optimization algorithm, the second optimization loop is executed when a first optimization objective has not been achieved in the first optimization loop, and
the excluding includes excluding the first cell, the second cell or the neighboring cell pair from the future execution of the first SON operation if the achievement status of the optimization objective after completion of the second optimization loop does not satisfy the predetermined reference level.

30. The method according to claim 27, wherein the executing includes checking whether each of the plurality of neighboring cell pairs is excluded from the first SON operation and executing the first SON operation on one or more neighboring cell pairs that are not excluded from the first SON operation among the plurality of neighboring cell pairs.

31. The method according to claim 27, further comprising:
receiving a change request message for requesting change of the configuration parameter from a neighboring base station; and
in response to the change request message, sending to the neighboring base station a rejection message indicating that the change of the configuration parameter is rejected, if a first neighboring cell pair consisting of the first cell and the second cell served by the neighboring base station is excluded from the first SON operation.

32. The method according to claim 27, further comprising executing a second SON operation regarding the radio network,
wherein the executing the second SON operation includes reducing a range in which the configuration parameter can be changed or setting the configuration parameter to a fixed value during the second SON operation on the first cell, the second cell or the neighboring cell pair that is excluded from the first SON operation.

33. The method according to claim 32, wherein the second SON operation includes one or both of Mobility Load Balancing (MLB) and Cell Range Expansion (CRE).

34. The method according to claim 27, further comprising:
executing Automatic Neighbour Relations (ANR); and
in response to updating of a neighboring cell list of the first cell by the ANR on the first cell, canceling the exclusion of the first cell or the neighboring cell pair from the first SON operation.

35. The method according to claim 27, further comprising, in response to exclusion of the second cell or the neighboring cell pair from the first SON operation, sending, to a neighboring base station that serves the second cell, a notification indicating that a fourth SON operation is prohibited.

36. The method according to claim 35, wherein the fourth SON operation includes Mobility Load Balancing (MLB).

37. A method performed by a base station apparatus that serves a first cell, the method comprising:
receiving from a neighboring base station a change request message for requesting change of a configuration parameter that affects an operation of one or both of the base station apparatus and a mobile station; and
in response to the change request message, sending to the neighboring base station a rejection message indicating that the change of the configuration parameter is rejected, if a first neighboring cell pair consisting of the first cell and a neighboring cell served by the neighboring base station is excluded from a Self-Organizing Network (SON) operation, the SON operation including repeatedly adjusting the configuration parameter to achieve an optimization objective regarding a radio network.

38. The method according to claim 37, wherein:
the change request message is a MOBILITY CHANGE REQUEST message of an X2 application protocol, and
the rejection message is a MOBILITY CHANGE FAILURE message of the X2 application protocol.

39. The method according to claim 37, further comprising excluding a neighboring cell pair from future execution of the SON operation, if achievement status of the optimization objective after completion of the SON operation on the neighboring cell pair does not satisfy a predetermined reference level.

40. A non-transitory computer readable medium that stores a program for causing a computer to perform a method for a Self-Organizing Network (SON) operation, wherein the method comprises:
executing a first Self-Organizing Network (SON) operation on a first cell of a base station, a second cell adjacent to the first cell, or a neighboring cell pair consisting of the first and second cells, the first SON operation including repeatedly adjusting a configuration parameter that affects an operation of one or both of the base station and a mobile station to achieve an optimization objective regarding a radio network; and
excluding the first cell, the second cell or the neighboring cell pair from future execution of the first SON operation, if achievement status of the optimization objective after completion of the first SON operation does not satisfy a predetermined reference level.

41. A non-transitory computer readable medium that stores a program for causing a computer to perform a method regarding a base station apparatus that serves a first cell, wherein the method comprises:
receiving from a neighboring base station a change request message for requesting change of a configuration parameter that affects an operation of one or both of the base station apparatus and a mobile station; and
in response to the change request message, sending to the neighboring base station a rejection message indicating that the change of the configuration parameter is rejected, if a first neighboring cell pair consisting of the first cell and a neighboring cell served by the neighboring base station is excluded from a Self-Organizing Network (SON) operation, the SON operation including repeatedly adjusting the configuration parameter to achieve an optimization objective regarding a radio network.

* * * * *